(12) United States Patent
Mettler et al.

(10) Patent No.: US 7,111,815 B2
(45) Date of Patent: Sep. 26, 2006

(54) BASE SUPPORT FOR POST OR OTHER UPRIGHT

(75) Inventors: Charles M. Mettler, Perry, OH (US); Gregory H. Brown, Stow, OH (US)

(73) Assignee: Plastic Safety Systems, Inc., Cleveland, OH (US)

( * ) Notice: Subject to any disclaimer, the term of this patent is extended or adjusted under 35 U.S.C. 154(b) by 10 days.

(21) Appl. No.: 10/737,019

(22) Filed: Dec. 16, 2003

(65) Prior Publication Data
US 2005/0127264 A1 Jun. 16, 2005

(51) Int. Cl.
*F19M 13/00* (2006.01)

(52) U.S. Cl. .................... 248/519; 248/520

(58) Field of Classification Search ............... 248/519, 248/520; 404/6, 9, 10
See application file for complete search history.

(56) References Cited

U.S. PATENT DOCUMENTS

| D26,715 S | * | 3/1897 | Bobrick ............... D6/495 |
| 3,380,438 A | | 4/1968 | Abrams |
| 4,269,534 A | * | 5/1981 | Ryan ...................... 404/10 |
| 4,275,535 A | * | 6/1981 | Stalzer ................... 52/100 |
| 4,596,489 A | * | 6/1986 | Mariol et al. ........... 404/10 |
| 5,186,438 A | * | 2/1993 | Cross et al. ........... 256/13.1 |
| 5,451,118 A | | 9/1995 | Wilkins et al. |
| 5,484,225 A | * | 1/1996 | Warner ..................... 404/9 |
| 5,560,732 A | | 10/1996 | Kulp et al. |
| 5,860,386 A | * | 1/1999 | Schwab et al. ......... 116/63 P |
| 6,041,559 A | * | 3/2000 | Schickert et al. ........ 52/165 |
| 6,182,600 B1 | | 2/2001 | Brown et al. |
| 6,520,712 B1 | | 2/2003 | Kulp et al. |
| 6,659,681 B1 | * | 12/2003 | Kulp et al. ................. 404/9 |

OTHER PUBLICATIONS

PST-III, Assembly & Parts list, © 1999 (enclosed).
Type III Barricade brochure (2 pages) dated Dec. 20, 2000 (enclosed).
Rad-Tec Rubber Products brochure (5 pages) dated Dec. 13, 2002 (enclosed).

* cited by examiner

*Primary Examiner*—Amy J. Sterling
(74) *Attorney, Agent, or Firm*—Renner, Otto, Boisselle & Sklar, LLP

(57) ABSTRACT

A base support for supporting a post or other upright in a generally upright position includes an elongated base member having a wider portion intermediate its length containing a mounting hole for receipt of an end portion of the post or other upright. A carrying handle may be provided on a side wall of the base member adjacent one end of the wider intermediate portion.

30 Claims, 3 Drawing Sheets

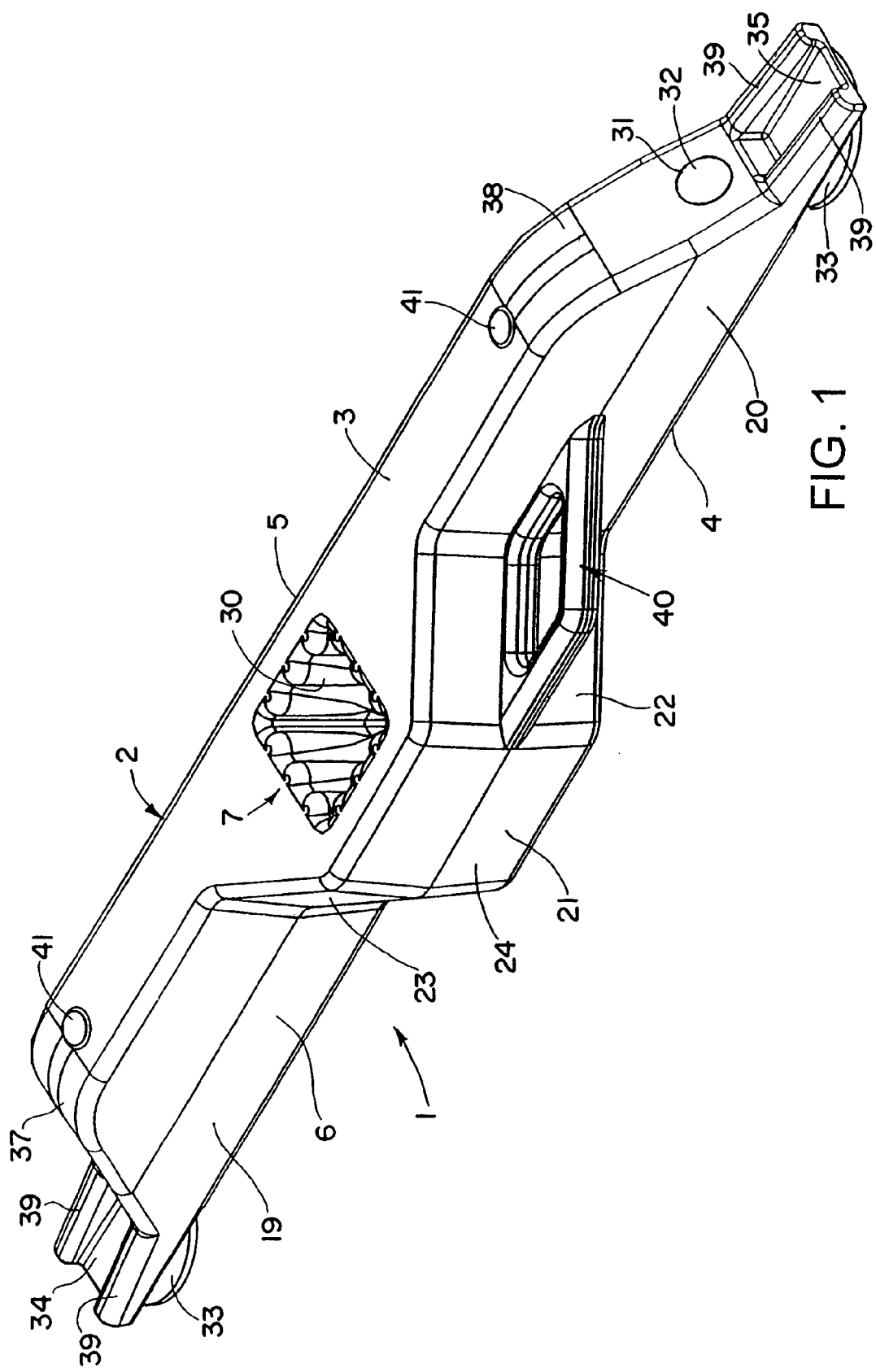

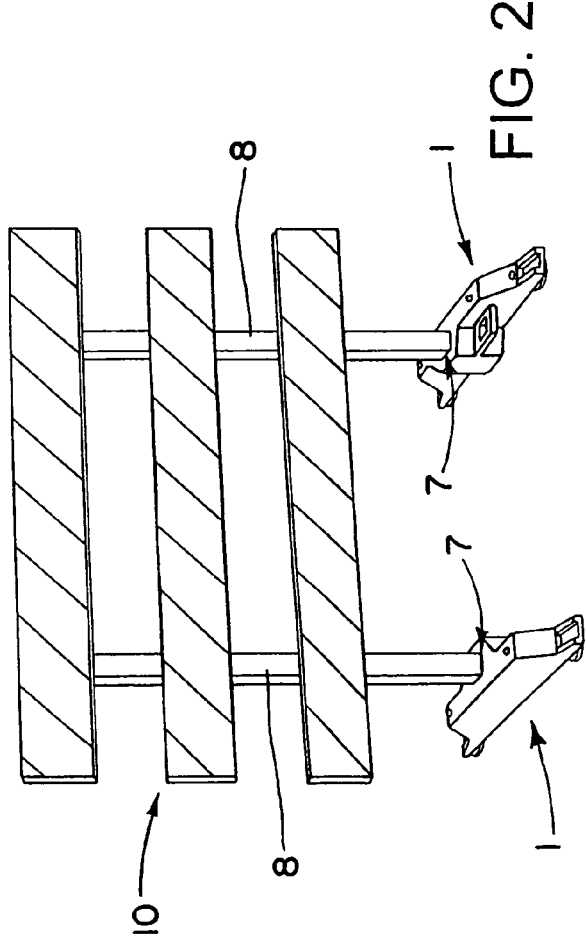
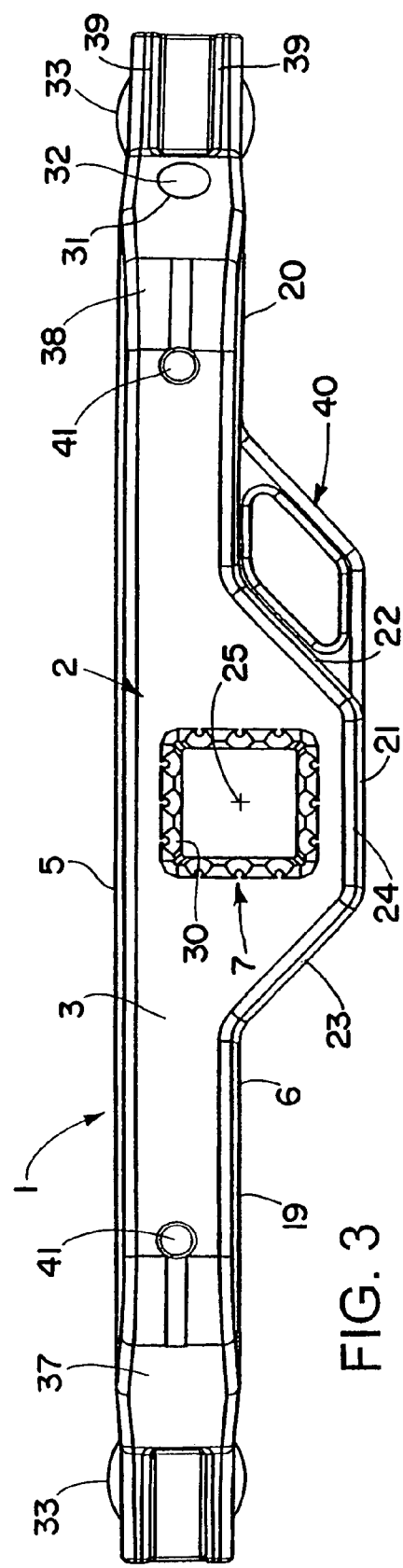

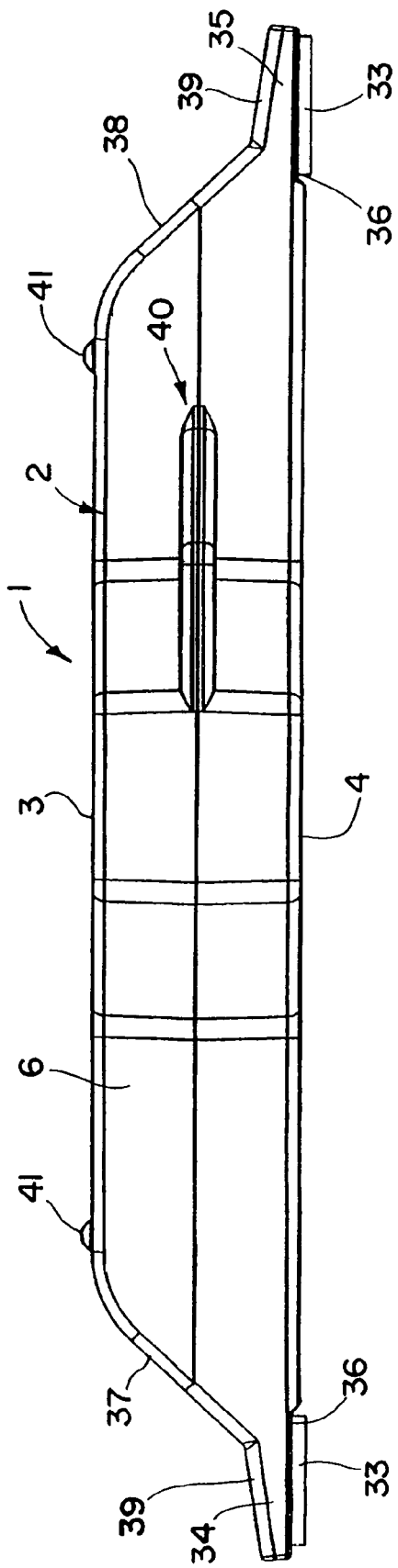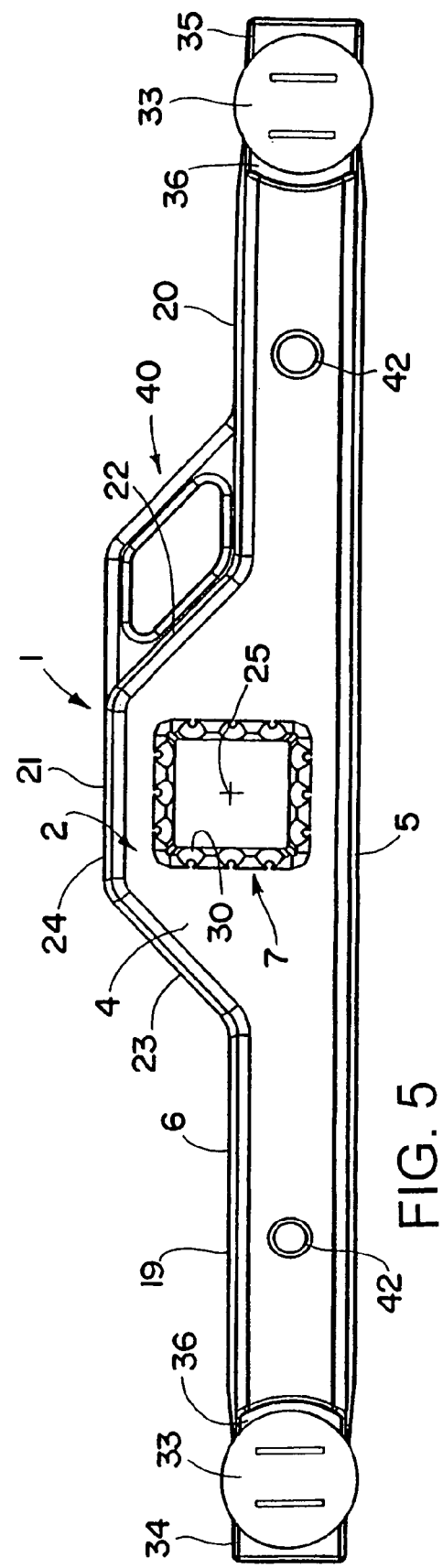

BASE SUPPORT FOR POST OR OTHER UPRIGHT

FIELD OF THE INVENTION

This invention relates to a base support for supporting an elongated member such as a post or other upright in a generally upright position.

BACKGROUND OF THE INVENTION

There are many different known types of base supports used to support posts or other uprights used for example to support portable traffic barricades, signs, fencing and other devices in a generally upright position. However, there is a continuing need for such a base support that includes both strength and flexibility in a cost effective design. Also there is a continuing need for such a base support that is relatively easy to set up and take down, and allows the post or other upright to break away from the base support if the traffic barricade, sign, fencing or other device supported thereby is impacted for example by a vehicle, thereby minimizing possible damage to the vehicle.

SUMMARY OF THE INVENTION

In accordance with one aspect of the invention, the base support comprises an elongated base member having a wider portion intermediate its length through which a mounting hole extends for receipt of an end portion of an elongated member.

In accordance with another aspect of the invention, the base member has a pair of spaced apart side walls, one of which may be substantially straight throughout its length and the other of which may be substantially straight and parallel to the one side wall except intermediate its length the other side wall may extend laterally outwardly to provide the base member with a wider intermediate width than end widths for the mounting hole.

In accordance with another aspect of the invention, the mounting hole may have a center that is substantially in the same plane as the end lengths of the other side wall of the base member.

In accordance with another aspect of the invention, a carrying handle may be provided on the one side wall adjacent one end of the wider intermediate width of the base member.

In accordance with another aspect of the invention, the carrying handle does not protrude laterally outwardly beyond the intermediate length of the other side wall that provides the wider intermediate width of the base member.

In accordance with another aspect of the invention, the mounting hole may have a plurality of laterally spaced longitudinally extending ribs that are transversely rounded for establishing line contact with an end portion of an elongated member when inserted into the mounting hole.

In accordance with another aspect of the invention, the base member may be substantially hollow and provided with a fill hole adjacent one end for ease of filling the base member with a flowable ballast material when stood up on the other end.

In accordance with another aspect of the invention, the base member may have solid opposite end portions that are substantially thinner than the base member intermediate the end portions to facilitate attachment of anti-skid pads to the bottom side at the end portions.

These and other objects, advantages, features and aspects of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, this being indicative, however, of but several of the various ways in which the principles of the invention may be employed.

BRIEF DESCRIPTION OF THE DRAWINGS

In the annexed drawings:

FIG. 1 is an enlarged perspective view of one form of base support in accordance with the present invention;

FIG. 2 is a perspective view showing two such base supports supporting the posts or uprights of a type Ill barricade or other device;

FIG. 3 is a top plan view of the base support of FIG. 1;

FIG. 4 is a side elevation view of the base support of FIG. 1 as seen from the front; and FIG. 5 is a bottom plan view of the base support of FIG. 1.

DETAILED DESCRIPTION OF THE INVENTION

Referring now in detail to the drawings, wherein the same reference numbers are used to designate like parts, there is shown one form of base support 1 in accordance with this invention which comprises an elongated base member 2 having spaced apart top and bottom walls 3, 4 and non-symmetrical opposite side walls 5, 6. Extending through base member 2 between top and bottom walls 3, 4 intermediate the ends thereof is a mounting hole 7 for receiving and supporting an end portion of a post or other upright (hereafter sometimes referred to as an elongated member) in a generally upright position when the base support is placed on a generally flat surface. FIG. 2 shows two such base supports 1 used, for example, to support two elongated members 8 of a type III barricade 10 used on construction sites to block oft roadways and the like. However, it will be appreciated that the elongated members may be used for any purpose desired including, for example, to support portable signs or fencing or the like.

Base member 2 may be made relatively lightweight and still have the desired strength and rigidity as by blow molding the base member out of a suitable plastic material such as high density polyethylene so that it is relatively thin walled and substantially hollow. To give base member 2 added weight during use, the base member may be filled with a suitable ballast material as described hereafter.

One of the side walls 5 of the base member may be straight and in the same plane throughout most of its length and height including particularly the intermediate length of the side wall 5 as shown in FIG. 3 to strengthen the base member against flexing along its length. The other side wall 6 may also be substantially straight and parallel to the one side wall 5 except for an intermediate length 21 of the other side wall which has a length that is substantially less than the intermediate length of the one side wall 5 and extends laterally outwardly to provide the base member with a wider intermediate width than end widths for containing the mounting hole.

End lengths 19, 20 of the other side wall 6 may be in substantial alignment with each other in parallel spaced relation from the one side wall 5. Intermediate length 21 of the other side wall may have outwardly angled end portions 22, 23 extending toward each other adjacent opposite sides of the mounting hole to resist flexing of the wall of the mounting hole. Extending between end portions 22, 23 in parallel spaced relation from the one side wall 5 is an intermediate portion 24 of the intermediate length 21 of the other side wall. The center axis 25 of mounting hole 7 extends in a direction perpendicular to the intermediate length of the top wall 3 and may be in the same plane as the end lengths 19, 20 of the other side wall 6 which is perpendicular to the intermediate length of the top wall as shown in FIGS. 3 and 5.

Although the dimensions of base member 2 may vary, in one form of the invention, the base member has an overall length of approximately 48 inches, a width of approximately 7⅜ inches at the widest portion, a width of approximately 3⅝ inches at the narrower end portions and a maximum height of approximately 6 inches. In this embodiment of the invention the intermediate width of the base member is somewhat more than twice as wide as the end widths. Different sized mounting holes 7 may be provided in the base member that are sized to closely receive different sized end portions of elongated members. For example, mounting hole 7 may be a 4-inch square hole for receiving 4-inch square end portions of plastic upright posts or a 2-inch square hole for receiving 2-inch square standard metal posts for supporting a type III barricade or other portable device as desired. The maximum width of the mounting hole in the length direction of the base member is less than the intermediate length 21 of the other side wall 6 of the base member as shown in FIG. 3. This allows the width of the mounting hole to extend widthwise outwardly beyond the end lengths 19, 20 of the other side wall 6 as further shown in FIG. 3.

Providing non-circular holes 7 in base supports 1 sized to closely receive correspondingly shaped elongated members precludes rotation of the base supports relative to the elongated members, whereby when two base supports are used to support two elongated members of a device such as a traffic barricade 10 as schematically shown in FIG. 2, there is no need for a cross piece between the two base supports.

Mounting hole 7 may be provided with a plurality of laterally spaced longitudinally extending ribs 30 on all four sides of the mounting hole that are transversely rounded as shown in FIGS. 1, 3 and 5 to give the ribs added strength and still allow some flexing of the ribs to permit slightly oversized end portions of elongated members to be inserted into such mounting hole. In addition, the radius of ribs 30 may provide line contact with the exterior of elongated members to maintain vertical alignment of the elongated members in the mounting hole and reduce surface friction between the elongated members and ribs for ease of insertion of the elongated members into the mounting holes and to allow the elongated members to more easily break away from the base support if a traffic barricade 10 or other device supported by the elongated members is impacted by a vehicle, leaving the base member behind, thereby minimizing damage to the vehicle. Also depending on how heavily the barricade or other device is damaged upon impact, the barricade or other device may be reassembled onto the base supports for use as is, or with minimal replacement of one or more damaged components of the barricade or other device supported by the base supports. Further, the axial outermost ends of ribs 30 at one or both ends of mounting hole 7 may be axially rounded to facilitate insertion of the elongated members into the mounting hole from either end. When an elongated member is inserted into the mounting hole, the bottom end of the elongated member desirably rests on the ground or other support surface to support the majority of the weight carried by the elongated member.

A fill hole 31 with a removable plug 32 may be provided adjacent an end of the base support to permit filling of the base support with a flowable ballast material such as sand. Also water could be used as the ballast material in applications where the base supports are used for a short duration. If the base supports are used in a climate where the temperature drops below freezing, water can still be used as the ballast if antifreeze is added to the water to keep the water from freezing.

Locating fill hole 31 adjacent one end of base support 1 has the advantage that the base support may be stood up on the other end for ease of filling the base support with ballast material.

Anti-skid pads 33 may be attached to the bottom wall 4 of base member 2 adjacent opposite end portions 34, 35 for increased stability. The skid pads 33 may be annular and have a diameter greater than the width of the end portions 34, 35 as shown in the various drawing figures. Suitable arcuate recesses 36 (see FIGS. 4 and 5) may be provided in the bottom wall at the end portions in which arcuate portions of the anti-skid pads are received to aid in locating the anti-skid pads on the bottom wall. Any suitable adhesive may be used to adhere the anti-skid pads to the bottom wall. Also suitable fasteners such as screws, bolts, staples or rivets may be used to secure the anti-skid pads in place. If fasteners are used, the top wall 3 of base member 2 may have angled surfaces 37, 38 that slope outwardly toward the bottom wall 4 toward the end portions 34, 35 which may be made relatively thin and substantially solid to facilitate attachment of the anti-skid pads to the bottom wall end portions. Also the top of the end portions may be provided with raised ribs 39 for increased strength. Locating the fill hole 31 in one of the angled surfaces 37, 38 of top wall 3 will make it easier to fill the base member through the fill hole when the base member is stood up on the end furthest from the fill hole.

A carrying handle 40 may be provided on the base support for ease of mobility and carrying of multiple base supports. Preferably carrying handle 40 extends axially from the exterior of one end portion 22 of the intermediate length 21 of the other side wall 6 along an exterior portion of the end length 20 of the other side wall 6 toward the end containing the fill hole 31 for grasping during filling of the support member with fill material. Also carrying handle 40 desirably does not protrude laterally outwardly beyond the intermediate length 21 of the other side wall 6 and is confined within the total height dimension of the base member so the carrying handle is out of the way during use or shipment or storage of the base support. Two or more spaced apart stacking projections or ribs 41 may be provided on the top or bottom wall 3, 4 of the base support for receipt in a pair of corresponding recesses 42 (see FIG. 5) on the other of the top and bottom walls for receipt of the stacking ribs to maintain a plurality of the base supports in alignment with one another when stacked one on top of another.

Although the invention has been shown and described with respect to certain embodiments, it is obvious that equivalent alternations and modifications will occur to others skilled in the art upon the reading and understanding of the specification. In particular, with regard to the various functions performed by the above described components, the term (including any reference to a "means") used to describe such components are intended to correspond, unless otherwise indicated, to any component which performs the specified function of the described component (e.g., that is functionally equivalent), even though not structurally equivalent to the disclosed component which performs the functions in the herein exemplary embodiment of the invention. In addition, while a particular feature of the invention may have been disclosed with respect to only one embodiment, such feature may be combined with one or more other features of other embodiments as may be desired or advantageous for any given or particular application.

What is claimed is:

1. A base support for supporting an elongated member in a substantially upright position comprising a base member having a greater length than width and bottom and top walls and non-symmetrical opposite side walls, one of the side walls having an intermediate length that is straight and in the same plane throughout its length and height, and the other of the side walls having an intermediate length that is spaced further from the plane of the intermediate length of the one side wall than end lengths of the other side wall to provide the base member with a wider intermediate width than end widths, and a mounting hole extending through the top wall in the wider intermediate width for closely receiving an end portion of an elongated member to maintain the elongated member in a substantially upright position when the base member is placed on a generally horizontal support surface, the mounting hole having a maximum width in the length direction of the base member that is less than the intermediate length of the other side wall and that extends widthwise outwardly beyond the end lengths of the other side wall.

2. The base support of claim 1 wherein the end lengths of the other side wall are in alignment with each other in parallel spaced relation from the intermediate length of the one side wall and the mounting hole has a center axis that extends in a direction perpendicular to an intermediate length of the top wall and is in the same plane as the end lengths of the other side wall which is perpendicular to the intermediate length of the top wall.

3. The base support of claim 2 wherein the intermediate length of the other side wall has outwardly angled end portions adjacent opposite sides of the mounting hole extending toward each other to resist flexing of a wall of the mounting hole and an intermediate portion extending between the end portions in parallel spaced relation to the one side wall.

4. The base support of claim 1 wherein the mounting hole extends completely through the base member.

5. The base support of claim 1 wherein the mounting hole is substantially square shaped with four sides and has a plurality of laterally spaced longitudinally extending ribs on all four sides of the mounting hole that are transversely rounded for establishing line contact with a similarly square shaped end portion of the elongated member when inserted into the mounting hole.

6. The base support of claim 5 wherein upper end portions of the ribs are axially rounded to facilitate insertion of the end portion of the elongated member into the mounting hole through the top wall.

7. The base support of claim 1 wherein the base member is substantially hollow and the top wall of the base member has angled surfaces that slope outwardly toward the bottom wall adjacent opposite ends of the base member, and there is a fill hole in one of the angled surfaces of the top wall adjacent one end for ease of filling the base member with a flowable ballast material when stood up on the other end.

8. The base support of claim 7 wherein the base member has thinned out non-hollow solid end portions, further comprising annular anti-skid pads having a diameter greater than the width of the end portions attached to the bottom wall at the end portions.

9. The base support of claim 8 wherein the bottom wall has arcuate recesses at the end portions in which arcuate portions of the anti-skid pads are received to aid in locating the anti-skid pads on the bottom wall.

10. The base support of claim 8 wherein the anti-skid pads are stapled to the bottom wall at the end portions.

11. The base support of claim 8 wherein the top wall of the end portions has raised ribs to provide increased strength at the end portions.

12. The base support of claim 1 wherein one of the top and bottom walls has a plurality of axially spaced apart stacking ribs and the other of the top and bottom walls has corresponding recesses for receipt of the stacking ribs of other such base supports to maintain a plurality of the base supports in stacked relation when stacked one on top of another.

13. The base support of claim 1 further comprising a carrying handle on an exterior side of the base member.

14. The base support of claim 13 wherein the carrying handle is attached to the exterior of the other side wall of the base member.

15. The base support of claim 14 wherein the carrying handle extends axially from the exterior of one end portion of the intermediate length of the other side wall along an exterior portion of one of the end lengths of the other side wall.

16. The base support of claim 15 wherein the carrying handle is integral with the exterior of the other side wall of the base member.

17. The base support of claim 15 wherein the carrying handle protrudes laterally outwardly beyond one of the end lengths of the other side wall but not laterally outwardly beyond the intermediate length of the other side wall.

18. The base support of claim 1 wherein the base member is made of molded plastic.

19. A base support comprising a base member for supporting an elongated member in a substantially upright position, the base member having top and bottom walls and non-symmetrical opposite side walls, one of the side walls having an intermediate length that is straight throughout its length and height, and the other side wall being substantially straight and parallel to the one side wall except for an intermediate length of the other side wall which has a length substantially less than the intermediate length of the one side wall and extends laterally outwardly to provide the base member with an intermediate width at least twice as wide as end widths of the base member, and a substantially square mounting hole with four sides extending through the intermediate width of the base member for receipt of a similarly shaped end portion of the elongated member, the mounting hole having a width less than the intermediate length of the other side wall and greater than the end widths and less than the intermediate width of the base member.

20. The base support of claim 19 wherein the mounting hole has a center axis that is in the same plane as end lengths of the other side wall which plane is perpendicular to an intermediate length of the top wall.

21. The base support of claim 19 wherein the intermediate length of the other side wall has outwardly angled end portions adjacent opposite sides of the mounting hole that extend toward each other to resist flexing of a wall of the mounting hole and an intermediate portion extending between the end portions in parallel spaced relation to the intermediate length of the one side wall.

22. The base support of claim 19 wherein the mounting hole has a plurality of laterally spaced longitudinally extending ribs on all four sides of the mounting hole that are transversely rounded for establishing line contact with a similarly square shaped end portion of the elongated member when inserted into the mounting hole.

23. The base support of claim 22 wherein the ribs have axially rounded end portions to facilitate insertion of the end portion of the elongated member into the mounting hole.

24. A base support for supporting an elongated member in a generally upright position comprising a base member having spaced apart top and bottom walls and opposite side walls, and a substantially square mounting hole with four sides extending through the base member between the top and bottom walls, the mounting hole having a plurality of laterally spaced longitudinally extending ribs on all four sides of the mounting hole that are transversely rounded for establishing line contact with a similarly square shared end portion of an elongated member when inserted into the mounting hole, the base member being substantially hollow and the top wall of the base member having angled surfaces that slope outwardly toward the bottom wall adjacent opposite ends of the base member, and a fill hole in one of the angled surfaces of the top wall adjacent one end for ease of filling of the base member with a flowable ballast material when stood up on the other end.

25. The base support of claim 24 wherein the ribs have axially rounded end portions adjacent the top wall to facilitate insertion of the end portion of an elongated member into the mounting hole.

26. A base support for supporting an elongated member in a generally upright position comprising a base member having spaced apart top and bottom walls and opposite side walls, and a substantially square mounting hole with four sides extending through the base member between the top and bottom walls, the mounting hole having a plurality of laterally spaced longitudinally extending ribs on all four sides of the mounting hole that are transversely rounded for establishing line contact with a similarly square shaped end portion of an elongated member when inserted into the mounting hole, the base member having solid opposite end portions that are substantially thinner than an intermediate length of the base member, and annular anti-skid pads having a diameter greater than the width of the end portions attached to the bottom wall at the end portions.

27. The base support of claim 26 wherein the bottom wall of the base member has arcuate recesses at the end portions in which arcuate portions of the anti-skid pads are received to aid in locating the anti-skid pads on the bottom wall at the end portions.

28. A base support for supporting an elongated member in a substantially upright position comprising a base member having a greater length than width and bottom and top walls and opposite side walls, one of the side walls being substantially straight throughout its length and height, and the other of the side walls having an intermediate length that is spaced further from the plane of the one side wail than end lengths of the other side wall to provide the base member with a wider intermediate width than end widths, and a mounting hole extending through the top wall in the wider intermediate width for closely receiving an end portion of an elongated member to maintain the elongated member in a substantially upright position when the base member is placed on a generally horizontal support surface, the top wall of the base member having angled surfaces that slope outwardly toward the bottom wall adjacent opposite ends of the base member, and the base member being substantially hollow and having a fill hole in one of the angled surfaces of the top wall adjacent one end for ease of filling the base member with a flowable ballast material when stood up on the other end.

29. A base support for supporting an elongated member in a substantially upright position comprising a base member having a greater length than width and bottom and top walls and opposite side walls, one of the side walls being substantially straight throughout its length and height, and the other of the side walls having an intermediate length that is spaced further from the plane of the one side wall than end lengths of the other side wall to provide the base member with a wider intermediate width than end widths, and a mounting hole extending through the top wall in the wider intermediate width for closely receiving an end portion of an elongated member to maintain the elongated member in a substantially upright position when the base member is placed on a generally horizontal support surface, and a carrying handle attached to the other side wall of the base member, the carrying handle extending axially from the exterior of one end portion of the intermediate length of the other side wall along an exterior portion of one of the end lengths of the other side wall.

30. The base support of claim 29 wherein the base member is substantially hollow and has a fill hole adjacent the end of the base member toward which the carrying handle extends to allow the base member to be filled with flowable ballast material through the fill hole when the base member is stood on the other end.

* * * * *